Figure 1:
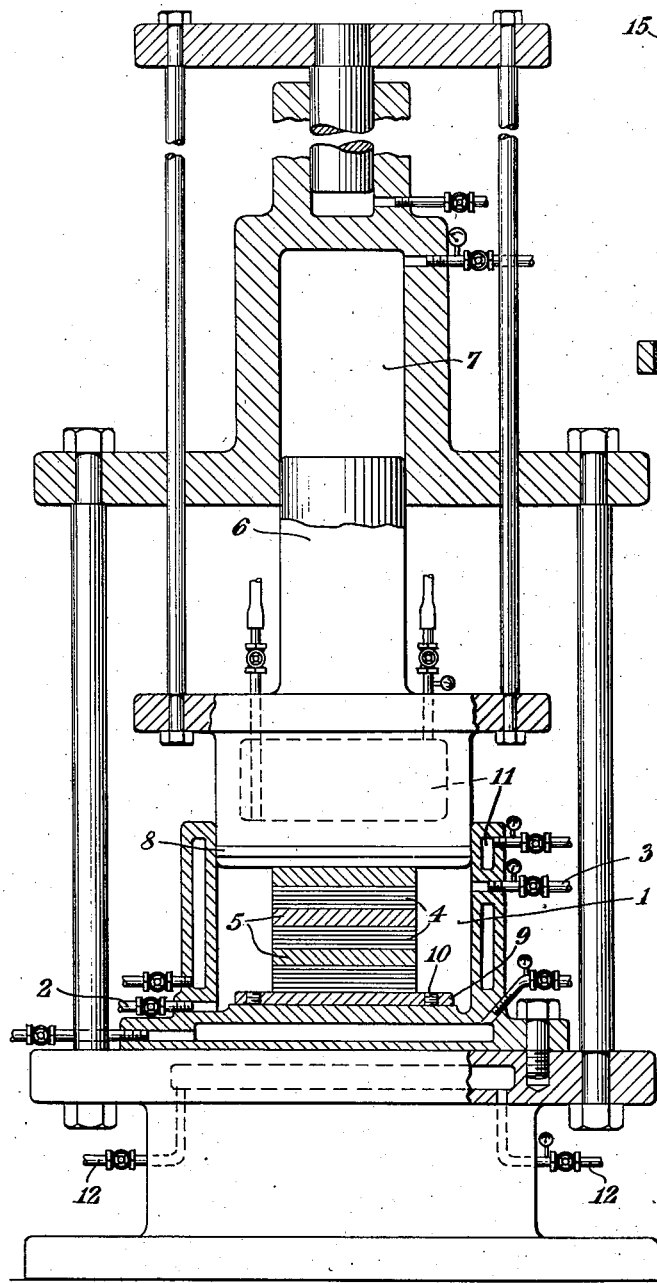

Dec. 19, 1939.  V. H. TURKINGTON  2,183,857

METHOD FOR PRODUCING MOLDED ARTICLES UNDER HEAT AND PRESSURE

Original Filed May 14, 1934

INVENTOR
Victor H. Turkington
BY
ATTORNEY

Patented Dec. 19, 1939

2,183,857

UNITED STATES PATENT OFFICE 2,183,857

METHOD FOR PRODUCING MOLDED ARTICLES UNDER HEAT AND PRESSURE

Victor H. Turkington, Caldwell, N. J., assignor to Bakelite Corporation, New York, N. Y., a corporation of Delaware Substitute for applications Serial Nos. 725,576 725,577, and 725,578, May 14, 1934. This application October 22, 1938, Serial No. 236,510

17 Claims. (Cl. 18—55)

This invention relates to a method and apparatus for the production of compositions comprising a fibrous filler and a binder, that are molded or otherwise formed into materials or directly into articles by means of the application of heat and pressure, or heat and pressure with after-cooling under pressure, wherein high impact strength and a minimum of dimensional change under heat or in the presence of moisture or oils or other fluids are of importance.

The invention includes compositions comprising a filler and a thermoplastic binder that are molded under a higher heat-pressure-lower heat cycle as well as compositions comprising a filler and a urea resin binder, that are molded under heat and pressure into semi-finished materials or directly into articles, and more particularly to materials of a laminated character comprising a fibrous sheet or fibrous sheets bonded together under the heat-pressure-cooling cycle or under heat and pressure, which may be machined into various articles, for instance gears and the like wherein high impact strength and low specific gravity are of importance and a minimum of swelling or dimensional change in the presence of moisture and oils are desirable.

Ordinary molding powders of apparent density of 0.4 to 0.6 are now in commercial practice often subjected to two successive molding cycles in that they are first preformed or pilled on a tabletting machine using room temperatures and pressures of 8000 to 10,000 lbs. per square inch. These pills are very weak mechanically since the powder has simply been compressed to exclude air and no great amount of plastic flow has occurred. They are weak due to a discontinuous state of the bonding agent but have a very desirable density range of about 0.8 to 1.0 specific gravity. When such pills are molded under heat and pressure they are compressed to a specific gravity about 1.35 to 1.4.

Commercial methods for molding under heat and pressure also consist of impregnating fabrics or mixing filling materials with bonding powders, molding under heat and pressure either under flat plates or in a shaped mold with at least one movable element, in order to compact the heated mass into a hard, dense structure. The urea resinoid materials under heat and pressure become hard and may be removed hot from the mold. In urea resinoid molding materials it is customary to leave a definite percentage of combined water or other dissolved material which may act as flowing agents or lubricants, remaining in the finished product after molding. The thermoplastic materials flow under heat and pressure to form a dense mass which retains this density when the article is cooled as it must be for removal from the mold since the thermoplastics do not solidify under heat.

Reacted or shaped materials made as above, are characterized by very dense structure, for instance wood having an apparent specific gravity of approximately 1.0 is ground into pulp and bonded by resins into an article of specific gravity of 1.35 to 1.50 and may be fashioned into gears, building elements for instance handles, wallboard, boxes, doors, and similar articles but they are nevertheless affected to a sufficient extent by swelling agents, for instance moisture and/or heat to result in a pronounced dimensional change of the whole mass. In wallboard, the expansion and contraction may result in a loose fitting board in dry weather and one which expands and warps in hot weather. For such uses for instance in automobile timing gears, where gear teeth must be accurately cut and fitted, slight swelling results in binding and in excessive wear in spots with consequent noise. In doors, the expansion and contraction may result in a loose fitting door in dry weather and one which sticks in wet weather. In the case of the urea materials molded into doors and similar articles, these may be colored as desired since the basic urea materials are without color and stable to light. The urea resins in contact with for instance, phenolic-aldehyde resins have been subject to two definite commercial faults namely cracking with age and a pronounced sensitivity to change by contact with water.

The present invention provides means and method together with suitable materials for the production of shaped articles which are superior to those above mentioned in comparative freedom from swelling or change in dimensions under severe conditions of heat, moisture or oil, or both swelling and change, and more economical by reason of a lower specific gravity in the bonded piece.

I have discovered that if the previously mentioned pills or molding material are saturated with a volatile non-solvent they can be heat-treated under pressure and become of high strength with continuous bonded structure but with a vesiculated structure still having a desirable low gravity of less than 1.2. Articles made in accordance with this invention are surprisingly superior to those obtained from bonded materials produced in the usual way and in common use, particularly in their mechanical strength, low cost per unit volume, and freedom from expansion and contraction, characteristics which are evidently highly desirable on account of economies of design that are possible with a stronger material and also in their marked resistance to wear and breakage. Tests have shown that gears made in accordance with the present invention have run with about one-tenth of the surface wear that occurs with gears cut from hitherto known compositions. Materials molded by this method have a much greater machinability, being more readily workable and more like wood in being tougher, more easily drilled and more susceptible of nailing and punching than the standard high density molded plastics, all of which renders the material particularly applicable for the production of building elements.

Briefly stated the improved pressure molded articles made in accordance with the present invention involving the expansion or vaporization under heat and pressure of a non-solvent fluid correlated in expansion under heat to the softening and hardening temperatures of the plastic, are obtained by a controlled means of directly producing in the bonding medium small voids or pores resulting from the presence of discrete particles of the non-solvent giving a honeycomb or spongelike structure; that is, the heat and pressure bonded structure is vesiculated or formed as a network. I may use a non-binding material of fluid producing type to produce stronger structure of the binder such for instance, as the use of ammonium carbonate, methyl malonic acid, or diazoacetamide in, for instance, a thermoplastic resin like polymerized styrene or a temporarily thermoplastic binder resin like the masses from ureaformaldehyde which harden under the action of heat. For convenience I shall denominate the resulting physical structure of the binder as porous including thereby those structures wherein the voids or pores of the bond are unfilled or are filled temporarily with some third ingredient. Fillers may be used with the binders containing the pore producing ingredient. Fillers include any solid except those solid pore producing substances which occupy a much greater space when heated, for example ammonium carbonate which decomposes when sufficiently heated.

A specific method of securing a porous structure comprises preparing a composition by impregnating a woven fabric or a felted sheet with an appropriate plastic material and driving off the solvent by heat. The thermoplastic materials are those binding materials which flow under heat and pressure and require a lower temperature before discharge from the hot molding cycle but which are not substantially changed in the molding cycle and may be remolded as often as desired. The resinoids are resin compositions which may also contain fillers, rendered plastic for instance by water but convertible to a hard, infusible, insoluble condition by heat. In the case of the urea aldehyde resinoids, this includes the urea formaldehyde resinoids, the urea thio-urea aldehyde mixed resinoids, the urea-aldehyde resinoids generally and in general the binding materials derived from urea or substituted ureas as well as the potentially reactive phenol-formaldehyde resinoids and the phthalic anhydride-glycerol resinoids which may be set to a hardened condition and rendered substantially infusible by heating. The impregnated sheet is then soaked in an appropriate liquid, for instance water, gasoline, ethyl diazoacetate, etc., which is a non-solvent for the finished binder and which is volatile at or below the highest heat used in the molding cycle or in the case of the thermoplastic materials, which is a volatile at or below the melting point of the plastic as measured under molding pressure used in the molding cycle until the sheet is penetrated to the desired amount, after which it is cut and built up into packs or the packs can be made up from impregnated fabric and then soaked and finally subjected to heat and pressure, preferably in the manner hereinafter described. The liquid-containing pieces may be used for the entire structure or any part thereof, for instance in a gear the shock resistant material may be on the rim and the usual high density material near the hub. In a bowling ball or handle, the porous light weight shock resistant non-cracking material may be at the center and in wallboard the porous, shock resistant material may be on the surface and the usual high density material at the center. The porosity, shock resistance, gravity, etc., may thus be controlled in any part of a molded article.

In following the customary pressing or molding procedure, some of the excess non-solvent is forced out and an additional amount may be lost by evaporation. However, part of the expanded non-solvent remains while the binder is reaching the stage where it is set and will no longer flow under applied pressure and is ready for discharge from the mold, this non-solvent occupying a portion of the total volume and being intimately mixed with the binder and filler. During the latter stages of the heating period or in a subsequent heating after removal from the press, the evaporable non-solvent may be expelled leaving a vast number of very minute pores in the material. It is usually desirable, however, to leave a certain amount of water in the materials containing cellulose filler, say, from 2% to 6% of the weight of the finished piece as this tends to preserve the strength of the cellulose filling material.

The temperatures and pressures of the press should preferably be correlated and the temperature in the case where the material is heated after removal from the press, should be regulated with the end in view that the non-solvent should form a vapor phase or a discrete portion of the structure in order to produce pores and hold these structural pores open until the material has set, after which the non-solvent may be removed or not as desired and subsequent heating either with or without pressure may be used to harden the material to the extent desired.

It will be understood that considerable variation in the structure of the material can be produced by varying the amount of non-solvent used and also by varying in the molded article the proportion and/or position of the non-solvent treated material used and also by varying the conditions of pressing, such as time, temperature and pressure in either the heating or cooling part of the cycle, or both, and their correlation. In the case of urea materials it is desirable to have free water or other non-solvent present at the time the material is set under heat. The characteristics of the molded piece may further be controlled by the vapor in which it is molded.

It will also be evident that water is not the only ingredient suitable for producing a porous structure containing voids as described above, and in general any liquid or solid may be used which is sufficiently volatile to be released from the material to produce the pores at temperatures obtainable in commercial practice, either at atmospheric pressure or under reduced or higher pressures. For example, the non-solvent liquids used in the preparation of a resinoid or binding material solution, with which the fabric or the filler is impregnated, can be retained in whole or in part instead of substituting water or other liquid and the pack or superposed laminations built therefrom. It is usually found more satisfactory, however, to use such as are not solvents for the synthetic resinoid or binding material.

Instead of soaking the binder impregnated fabric or other composition of bonding agent and filler in water or other liquid, other means can be used for applying it; for instance, the composition can be placed in a chamber where the humidity or vapor concentration of the non-solvent may be controlled to secure a definite amount of the liquid in the fabric; or the liquid can be sprayed thereon. Another method is the use in the fabric impregnating step of a solution of the binder in a mixture of solvents containing a considerable amount of water or other ingredient and then controlling the drying operation so as to leave the desired amount of water or other ingredient in the binder impregnated fabric. Still another way of obtaining the material is to form a dispersion of the resinous material or of the resinous material with non-liquid ingredients as pigments, colors, etc., and blend the filler with this. The resinous material may be either the continuous or dispersed phase but preferably the continuous phase. The term "dispersion" is intended to include emulsions or other suspensions. The dispersions may be prepared by agitation of a liquid or liquefied resinous material with water or other liquid or liquefied material in the absence or presence of an emulsifying agent, for instance metallic soaps, preferably emulsifying agents which are soluble in the resinous materials and substantially insoluble in the water or other non-solvent which is to be the dispersed phase.

As still another modification, there can be added either to the resinoid ingredients or to the impregnating solution, a substance capable of being partly or completely decomposed to a gas at the molding temperature, as for example a salt, such as ammonium carbonate, which, as in the case of the ureas, remain substantially unaffected at the temperature of softening of the resinoid ingredients.

Whatever the means employed, the feature regarded as important for the purposes of this invention as covered more specifically in the present application is that the resinoid or the combination of the resinoid bond and filler, at the beginning of the pressing and heating operation, shall contain or engender a third ingredient under such conditions correlated to the third ingredient as to cause the third ingredient to occupy space until the resinoid is set and, if necessary, capable of then being driven out of the material in any suitable manner, for instance, by heating at temperatures obtainable in commercial practice or capable of being dissolved out by soaking in a suitable solvent.

While the use of woven fabric in laminations is used for illustrative purposes in the above description, it will be understood that the same principle may also be applied to a felted mass or paper sheets, or to molding compounds containing fabric or other fillers, such as chipped canvas or cloth scrap, cotton flock, wood flour, asbestos or other filling materials.

Several illustrative examples of materials to which the invention is applicable are the following:

As an example of thermoplastic synthetic composition suitable for this purpose, 100 parts of an oil soluble phenolic resin are made by reacting 1 mol of tertiary butyl phenol and 1 mol formaldehyde in the presence of .1 mol alkaline catalyst to a hard, water-free resinous state and blending with from 20 to 300 parts of fatty oils either drying or non-drying and heating until the total mass becomes a composition with permanently thermoplastic, non-heat-hardening resinous properties with melting points as desired between 70° C. and 200° C. Water is a suitable non-solvent liquid at the proper pressure for producing low specific gravity material with this thermoplastic bond and ammonium carbonate or acid carbonate are suitable non-solvent solids.

Commercial synthetic resins as those of the vinyl ester or ether type, for instance, composed of mixture of vinyl acetate and vinyl chloride, polymerized by heating in presence of .1 per cent of benzoyl peroxide to a melting point of between 70° C. and 200° C., may be used. Commercial hexane, gasoline, and V. M. and P. naphtha, etc. are suitable non-solvents for use with this group of products.

Polymerized styrene may be used, for instance, with liquids like water.

Cellulose acetate, made for instance from cellulose and acetic anhydride may be produced with melting points between 70° C. and 200° C. and molded in the presence of such indifferent solvents as methyl alcohol, gasoline, naphtha, etc.

Compositions of "livered" paint or oils jelled with pigments may be hot or cold mixed with fillers and dried to a point where they will flow under heat but not in the cold. Such a non-heat hardening mass may be mixed with fillers, non-solvents like water or gasoline, etc. and molded with heat, pressure and cooling before discharge from the mold.

In general, water resistant binders, for instance those previously described, are preferred.

The thermoplastic materials flow under heat and pressure but must be chilled in order to harden before discharge from the mold; they are not chemically changed in the molding cycle and may be remolded.

As an example of a thermosetting urea resinoid suitable for this purpose 60 parts of urea are reacted with 130 parts of 37½% formaldehyde solution in the presence of 2 parts of hexamethylenetetramine for 20 minutes under reflux. To the resulting solution 2 parts of citric acid are added together with 58 parts of alpha cellulose and dyes, lubricants and pigments to form any desired color combination. This material which softens at approximately 90° C. is dried to constant weight at 60° C. and then used with water in the process herein described. In place of urea, mixtures of urea and thiourea may be used. In place of formaldehyde other aldehydes may be used in part. Substituted ureas and substituted formaldehydes can replace up to about three-quarters of the total mixture.

Figure 2:
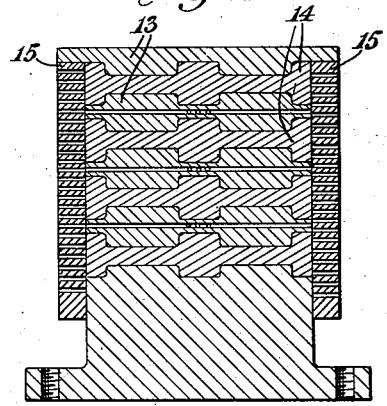

An illustrative apparatus for carrying out this invention is shown in the accompanying drawing, wherein Fig. 1 shows a longitudinal vertical section of an apparatus particularly adapted for the production of flat sheets of laminated material, and Fig. 2 shows a similar apparatus in conjunction with a series of molds adapted to produce articles having irregular surface contours.

The press comprises a chamber 1 which is capable of withstanding the desired pressure for instance a minimum of 150 lbs. per square inch. The chamber is fitted with valved pipe connections 2 and 3 for providing circulation and pressure control of a desired fluid medium which may be steam, hot oil, or any other gaseous or liquid hot or cold material which may best be suited to the various modifications of the desired process, for instance that outlined above. The resin-impregnated pack 4 is placed inside the chamber between spacing plates 5, or steel molds may be filled with the material and assembled in a stack where it is desired to produce molded shapes other than flat sheets. Stainless steel or chromium surfaced molds are preferred to prevent staining of the molds and sticking of the molded material. Controlled mechanical pressure is applied, for instance, through a ram 6 operating in a hydraulic cylinder 7. A piston ring 8 is used to seal the pressure chamber, or a gasket may be substituted to be squeezed against the walls to make a tight joint. Other means may be used to seal the chamber, such as an ordinary stuffing box.

This type of apparatus has the advantage that whatever volatile ingredient is included in the plastic mixture for producing the porous structure as described above, it may be retained in the material in the desired quantity and for the desired length of time and there is no tendency for the center of the piece to differ in composition or structure from the outer portions. The heat is quickly and uniformly transmitted to the whole mass of material and the surrounding fluid medium exerts a hydrostatic pressure which may be high enough to give a molding pressure over the portion of the plastic material which is not subjected to the direct pressure of the ram or molds.

Another advantage of this type of press is that the capacity is considerably increased due to the absence of a multiplicity of hollow heated platens, the loading space being correspondingly increased. The heating or cooling connections to these multiple platens in the ordinary type of press are also cumbersome and a source of constant trouble, and the difficulty of obtaining uniformity of heating or cooling in a multiple platen press is also well known. This pressure chamber type of press overcomes both of these difficulties, for a heated fluid can be circulated in the chamber 1, if necessary, to supply the heat required which is readily transmitted through the spacing plates or molds. The same is true for a cooling fluid which is desirable for cooling the molded mass where a thermoplastic material is used.

By varying the amount or type of vapor, for instance water, carried by another vapor or gas, for instance air, it is possible to control the amount of non-solvent in the plastic material; for instance where saturated air is used very little moisture will be removed from the plastic material and, in fact, moisture may be added to the plastic material, and where substantially dry air is used much of the moisture may be removed from the plastic material. The characteristics of the parts of the molded article may also be controlled; for instance where the molding material contains enough non-solvent to give a certain porosity at the center, the porosity of the exterior portions may be increased or decreased by increasing or decreasing the amount of non-solvent vapor surrounding the molded piece and thus controlling the loss of non-solvent from the surface of the piece being molded. The time, temperature and pressure of molding may be controlled so that the effect of the vapor extends inwardly from the surface to the desired depth.

Furthermore, a vacuum may be applied to this chamber to assist in forming or holding the porous structure during the heating or cooling molding cycle or both. As previously stated, the surrounding fluid medium which enters the chamber through the pipes 2 and 3 may be hot or cold water or oil as well as steam. For thermoplastic materials which soften at a low temperature, a vapor may be applied under a partial vacuum or hot or cold air either dry or carrying the desired amount of moisture or other vapor may be used. In this way, either a thermoplastic material or a heat setting material for instance a urea resinoid having water as a non-solvent may be treated in a partial vacuum using hot air carrying water vapor. The lowered pressure assists in forming the porous structure. With both types of material and particularly with thermoplastic material, a vacuum may thereafter be partially retained while the material is cooled by surrounding the mass with cold air. The mere application of vacuum will assist in cooling the plastic mass by vaporization of the low volatile liquid.

The fluid chamber type of press is also exceptionally well adapted to molding single very large and/or thick pieces for instance heavy doors, with a minimum of internal strain and a minimum of cracking since the chamber fluid provides means for applying heat more directly, simultaneously, and uniformly with greater efficiency to all parts of the piece than where heated platens or indirect heating means are used, thus minimizing strains in the molded piece.

For convenience in loading and unloading, the chamber may be arranged so that it can be swung or moved to one side allowing free access to the top. A loading rack 9 can be provided so that the entire charge may be assembled and lowered into the chamber at one time by handholds removably threaded into the openings 10 or in any other suitable manner.

Means for heating and for cooling the walls of the chamber and the plunger may take the form of spaces 11 for the heating or cooling medium which may enter or exit through the valved pipes 12. These may be used to control the circulation and pressure of the medium and thus control temperature. In case only heating is desired, electrical heating elements may be in the spaces 11 with leads passing through the pipes 12.

In Fig. 2 is shown molding means 13 for producing pieces 14 having an irregular contour. These pieces may, for instance, be gears or doors molded nearly or entirely to finished size. I prefer to shape a number of these articles in one operation and therefore use a series of cooperating dies having mold shapes on both faces so that they may be stacked with intermediate layers of molding material. Thus, when pressure is applied to the top die, a number of articles are produced in one operation of the press. If it is desired to produce shaped articles which have a perimeter nearly or entirely of the desired size, I may and prefer to use side supports 15 which act as retaining walls for the shaped pieces and guides for the freely moving die parts. The supports 15 may be provided with openings to permit steam to contact with the molding material and enter the openings through the dies 13.

Materials made in accordance with this invention and characterized by a porous structure have an unusually high resistance to impact as compared to the high density products; and although they are not impervious to water and may actually absorb greater percentages of water by weight than present high density commercial materials, they do not swell as much in over all dimensions and do not warp or crack when exposed for long periods of time to either hot or cold water or moisture or oils. This property makes them especially adapted for mechanical uses and for articles which are frequently or continuously in contact with water or moisture or oils, such as handles, washing machine agitators, wallboard, molded heat insulation, molded gaskets, etc., as well as gears, doors and similar articles. If desired, the materials may be given a surface coating of water or oil resisting material to prevent the transfer of water and the consequent filling of the pores of the material.

A further advantage is that materials made in accordance with the present invention are lighter in weight due to the porosity of the resulting structure and therefore effect savings in the amount required to produce an article of any given size or volume. This saving in some cases amounts to 20% or more as compared with articles formed in accordance with the practice of the hitherto known art. The lightness in weight and the freedom from dimensional change, aside from the saving in material, is also advantageous for many articles as for instance table tops and other pieces of furniture, etc. where a strong, light weight, light colored material adapted to coloring and exact staining to simulate wood or give other desirable effects is of definite commercial value. Whereas present molded materials made from cotton duck and plastic resins such as the urea formaldehyde resins have a specific gravity of 1.46 to 1.40, the materials made from the same ingredients and processed in accordance with this invention have a much lower specific gravity ranging from 1.25 to 1.00 or less than 1.00. Where other types of resinous materials and fillers are used, the specific gravities, of course, will be different from the above figures but, in general, the specific gravity of any resinous mixture treated in accordance with this invention will be correspondingly low and will be less than it would be if treated in accordance with the prior art methods.

The present application is a continuation of my co-pending applications Serial Numbers 725,576, 725,577, and 725,578, filed May 14, 1934.

I claim:

1. Method of molding plastic materials under heat and pressure which comprises forming a material which can be rendered plastic by heat and then hardened, incorporating with said material an added ingredient which expands at the temperature at which the material becomes plastic to thereby produce pores in the plastic material, molding the mixture under such heat and pressure as to expand the added ingredient while the mixture is plastic to produce pores and surrounding the plastic mixture while being molded with a medium capable of minimizing the dissipation of the ingredient from the material, and hardening the material.

2. Method of molding plastic materials under heat and pressure which comprises forming a material which can be rendered plastic by heat and then hardened, incorporating water with said material, molding the mixture under such heat and pressure as to vaporize the water while the mixture is plastic to produce pores and surrounding the plastic mixture while being molded with steam capable of minimizing the dissipation of the water from the material, and hardening the material.

3. Method of producing plastic materials under heat and pressure which comprises forming a material which can be rendered plastic by heat and then hardened, incorporating with said material an added ingredient which expands under heat during a later stage of the process, the expansion temperature of the added ingredient being correlated to the plasticizing and hardening temperatures of said material so that the added ingredient expands within the plastic material to produce pores, molding the mixture under such heat and pressure as to expand the added ingredient while the mixture is plastic to produce pores and surrounding the plastic mixture while being molded with a medium capable of minimizing the dissipation of the said ingredient from said material, and hardening the material.

4. A process of producing porous articles from a thermoplastic material, which comprises providing a thermoplastic material which softens under heat and hardens when cooled, incorporating with said material a liquid ingredient which expands during a later stage of the process, expanding the liquid and molding the mixture under heat and pressure whereby pores are produced and performing the molding step in a closed chamber with the plastic mass surrounded by fluid to minimize dissipation of the liquid from the mass during molding, and hardening the material while in the porous condition to hold the porous structure.

5. A process of producing porous articles from a thermoplastic material, which comprises providing a thermoplastic material which softens under heat and hardens when cooled, incorporating with said material a liquid ingredient which expands during a later stage of the process, expanding the liquid and molding the mixture under heat and pressure whereby pores are produced and performing the molding step in a closed chamber with the plastic mass surrounded by fluid under pressure to exert an even hydrostatic pressure on the parts of the plastic mass exposed to the fluid during molding, and hardening the material while in the porous condition to hold the porous structure.

6. A process of producing porous articles comprising a thermoplastic material, which comprises providing a thermoplastic material which softens under heat and hardens when cooled, incorporating with said material a liquid ingredient which expands during a later stage of the process, expanding the liquid and molding the mixture under heat and pressure whereby pores are produced and performing the molding step in a closed chamber with the plastic mass surrounded by an atmosphere comprising the said liquid to minimize dissipation of the liquid from the mass during molding and hardening the material while in the porous condition to hold the porous structure.

7. A process of producing porous articles from a synthetic thermoplastic material, which comprises providing a thermoplastic material which softens under heat and hardens when cooled, incorporating water with said material in sufficient amount to have free water in the mixture, molding the mixture under heat and pressure and vaporizing the water while the mixture is plastic to produce pores, controlling the atmosphere surrounding the material being molded to control the escape of water from the mixture, and cooling the thermoplastic material to produce a hardened porous structure.

8. A process of producing porous articles from a thermoplastic material, which comprises providing a thermoplastic material which softens under heat and hardens when cooled, incorporating with said material a vaporizable ingredient which expands during a later stage of the process, expanding said ingredient and molding the mixture under heat and pressure whereby pores are produced and performing the molding step in a closed chamber with the plastic mass surrounded by a medium of controlled characteristics to control the amount of said ingredient crossing the surface of the mass during molding, and hardening the material while in the porous condition to hold the porous structure.

9. A process of producing porous articles comprising a thermoplastic material which comprises providing a thermoplastic material which softens under heat and hardens when cooled, incorporating with said material an added ingredient which expands during a later stage in the process, expanding the added ingredient and molding the mixture under heat and pressure whereby pores are produced and hardening the material while in the porous condition to hold the porous structure and performing the step of hardening the mixture under a vacuum to assist in holding the porous structure.

10. A process of producing porous articles comprising a thermoplastic material which comprises providing a thermoplastic material which softens under heat and hardens when cooled, incorporating with said material an added ingredient which expands during a later stage in the process, expanding the added ingredient and molding the mixture under heat and pressure whereby pores are produced and hardening the material while in the porous condition to hold the porous structure and performing the step of molding the mixture under a vacuum to assist in forming the porous structure.

11. A process of producing porous articles comprising a thermoplastic material which comprises providing a thermoplastic material which softens under heat and hardens when cooled, incorporating with said material an added ingredient which expands during a later stage in the process, expanding the added ingredient and molding the mixture under heat and pressure whereby pores are produced and hardening the material while in the porous condition to hold the porous structure and performing the step of expanding the added ingredient while the mixture is under a vacuum to assist in forming the porous structure.

12. A process of producing porous articles comprising a urea-aldehyde resinoid, which comprises forming a urea-aldehyde resinoid capable of hardening under heat and pressure, incorporating with said resinoid a liquid ingredient which expands during a later stage of the process but which remains free in the mixture, molding the mixture under such heat and pressure in a closed chamber of larger dimensions than the finished article as to vaporize the liquid ingredient while the mixture is plastic to produce pores and surrounding the plastic mixture while being molded in the chamber with a fluid capable of minimizing the dissipation of the liquid from the mass during molding, and hardening the resinoid to retain the porous structure.

13. A process of producing porous articles comprising a urea-aldehyde resinoid which comprises forming a urea-aldehyde resinoid capable of hardening under heat and pressure, incorporating with said resinoid a liquid ingredient which expands during a later stage of the process but which remains free in the mixture, molding the mixture under such heat and pressure in a closed chamber of larger dimensions than the finished article as to expand the liquid ingredient while the mixture is plastic to produce pores and surrounding the plastic mixture while being molded in the chamber with a fluid under pressure capable of exerting an even hydrostatic pressure upon the parts of the plastic mass exposed to the fluid during molding, and hardening the resinoid to retain the porous structure.

14. A process of producing porous articles comprising a urea-aldehyde resinoid, which comprises forming a urea-aldehyde resinoid capable of hardening under heat and pressure, incorporating with said resinoid a liquid ingredient which expands during a later stage of the process but which remains free in the mixture, molding the mixture under such heat and pressure in a closed chamber of larger dimensions than the finished article as to expand the liquid while the mixture is plastic to produce pores and surrounding the plastic mixture while being molded in the chamber with an atmosphere comprising said ingredient and capable of minimizing the dissipation of the liquid from the mass during molding, and hardening the resinoid to retain the porous structure.

15. A process of producing porous articles comprising a urea-aldehyde resinoid, which comprises forming a urea-aldehyde resinoid capable of hardening under heat and pressure, incorporating water with said resinoid in sufficient amount to have free water in the mixture, molding the mixture under such heat and pressure as to vaporize the water while the mixture is plastic to produce pores, surrounding the mixture while being molded with an atmosphere capable of controlling the escape of water from the mixture, and hardening the resinoid to produce a hardened porous structure.

16. A process of producing porous articles comprising a urea-aldehyde resinoid, which comprises providing a urea-aldehyde resinoid capable of hardening under heat and pressure, incorporating with said resinoid a vaporizable ingredient which expands during a later stage of the process but which remains free in the mixture, molding the mixture under such heat and pressure in a closed chamber of larger dimensions than the finished article as to expand the ingredient while the mixture is plastic to produce pores and surrounding the plastic mixture while being molded in the chamber with a medium of controlled characteristics capable of controlling the amount of said ingredient crossing the surface of the mass during molding, and hardening the resinoid while in the porous condition to hold the porous structure.

17. A process of producing porous articles comprising a urea-aldehyde resinoid which comprises forming a urea-aldehyde resinoid capable of hardening under heat and pressure, incorporating with said resinoid a volatile ingredient which expands during a later stage of the process, molding the mixture under such heat and pressure in a closed chamber as to volatilize the said ingredient while the mixture is plastic to produce pores and surrounding the plastic mixture while being molded in the chamber with a fluid at a sub-atmospheric pressure to assist in holding the pores, and hardening the resinoid to retain the porous structure.

VICTOR H. TURKINGTON.